(12) United States Patent
Gephart (10) Patent No.: US 6,339,766 B1
(45) Date of Patent: Jan. 15, 2002

(54) ELECTRONIC PAYMENT SYSTEM EMPLOYING LIMITED-USE ACCOUNT NUMBER

(75) Inventor: Brian R. Gephart, South Jordan, UT (US)

(73) Assignee: TransactionSecure, Centerville, UT (US)

( * ) Notice: Subject to any disclaimer, the term of this patent is extended or adjusted under 35 U.S.C. 154(b) by 0 days.

(21) Appl. No.: 09/205,416

(22) Filed: Dec. 2, 1998

(51) Int. Cl.$^7$ .............................................. G06F 17/60
(52) U.S. Cl. ............................ 705/44; 705/35; 705/37; 705/39; 705/40; 705/42
(58) Field of Search ............................ 705/44, 39, 35, 705/37, 40, 42; 235/380, 379, 375

(56) References Cited

U.S. PATENT DOCUMENTS

| | | | | |
|---|---|---|---|---|
| 4,314,352 A | * | 2/1982 | Fought | 364/900 |
| 4,630,201 A | | 12/1986 | White | 364/408 |
| 4,825,050 A | | 4/1989 | Griffith et al. | 235/379 |
| 4,839,504 A | * | 6/1989 | Nakano | 235/379 |
| 4,910,676 A | * | 3/1990 | Alldredge | 364/408 |
| 4,994,964 A | * | 2/1991 | Wolfberg | 364/408 |
| 5,175,416 A | * | 12/1992 | Mansvelt et al. | 235/379 |
| 5,210,687 A | * | 5/1993 | Wolfberg et al. | 364/408 |
| 5,251,259 A | | 10/1993 | Mosley | 380/23 |
| 5,326,960 A | * | 7/1994 | Tannenbaum | 235/379 |
| 5,351,296 A | * | 9/1994 | Sullivan | 380/24 |
| 5,469,497 A | * | 11/1995 | Pierce et al. | 379/115 |
| 5,478,993 A | | 12/1995 | Derksen | 235/380 |
| 5,530,232 A | | 6/1996 | Taylor | 235/380 |
| 5,577,121 A | * | 11/1996 | Davis et al. | 380/24 |
| 5,591,949 A | | 1/1997 | Bernstein | 235/380 |
| 5,604,787 A | | 2/1997 | Kotzin et al. | 379/58 |
| 5,627,355 A | | 5/1997 | Rahman et al. | 235/380 |
| 5,659,165 A | * | 8/1997 | Jennings et al. | 235/379 |
| 5,675,779 A | * | 10/1997 | Doktor | 395/604 |
| 5,677,955 A | * | 10/1997 | Doggett et al. | 380/24 |
| 5,692,132 A | | 11/1997 | Hogan | 395/227 |

(List continued on next page.)

FOREIGN PATENT DOCUMENTS

JP        1161457    *  6/1989    ........... G06F/12/16

OTHER PUBLICATIONS

Landis, Ken; Consolidated Accounting Systemsm MacUser, v6, n5, p172(6), May 1990.*

Landis, Ken; Consolidated Accounting Systems, MacUse, v6,n5,p172(6), May 1990.*

(List continued on next page.)

Primary Examiner—Vincent Millin
Assistant Examiner—Pedro R. Kanof
(74) Attorney, Agent, or Firm—Workman, Nydegger & Seeley (57) ABSTRACT

Methods and systems for enabling an account holder to authorize the transfer of funds from an account using a limited-use account number. An account issuer establishes an account for the account holder and associates a regular account number and a limited-use account number with the account. The limited-use account number remains inactive until the account holder requests activation thereof The regular account number is activated and is made available to the account holder for use in any desired number of transactions. Upon receiving the request for activation of the limited-use account number, the account issuer activates the limited-use account number for either a specified period of time or a specified number of transactions. The account holder then uses the limited-use account number for the specified period of time or the specified number of transactions, after which the limited-use account number is deactivated until such time that the account holder again requests activation thereof Deactivation of the limited-use account number substantially prevents unauthorized persons from gaining unlimited access to the account.

34 Claims, 3 Drawing Sheets

U.S. PATENT DOCUMENTS

| | | | | |
|---|---|---|---|---|
| 5,715,399 A | | 2/1998 | Bezos | 395/227 |
| 5,727,163 A | | 3/1998 | Bezos | 395/227 |
| 5,793,028 A | * | 8/1998 | Wagener et al. | 235/380 |
| 5,793,302 A | * | 8/1998 | Stambler | 340/825.34 |
| 5,825,003 A | * | 10/1998 | Jennings et al. | 235/379 |
| 5,883,377 A | * | 3/1999 | Chapin, Jr. | 235/493 |
| 5,892,211 A | * | 4/1999 | Davis et al. | 235/380 |
| 5,892,900 A | * | 4/1999 | Ginter et al. | 395/186 |
| 5,903,881 A | * | 5/1999 | Schrader et al. | 705/42 |
| 5,907,597 A | * | 5/1999 | Mark | 379/93.03 |
| 5,920,847 A | * | 7/1999 | Kolling et al. | 705/40 |
| 5,936,221 A | * | 8/1999 | Corder et al. | 235/380 |
| 5,937,396 A | * | 8/1999 | Konya | 705/43 |
| 5,949,044 A | * | 9/1999 | Walker et al. | 235/379 |
| 5,956,700 A | * | 9/1999 | Landry | 705/40 |
| 5,963,647 A | * | 10/1999 | Downing et al. | 380/24 |
| 5,963,922 A | * | 10/1999 | Helmering | 705/35 |
| 5,984,191 A | * | 11/1999 | Chapin, Jr. | 235/493 |
| 6,016,484 A | * | 1/2000 | Williams et al. | 705/39 |
| 6,021,202 A | * | 2/2000 | Anderson et al. | 380/25 |
| 6,029,890 A | | 2/2000 | Austin | 235/380 |

OTHER PUBLICATIONS

Daun, Debbie; Artisoft Announces Voice Support in Version 3.0 of . . . ; News Release, pN/A, May 1990.*

* cited by examiner

ELECTRONIC PAYMENT SYSTEM EMPLOYING LIMITED-USE ACCOUNT NUMBER

BACKGROUND OF THE INVENTION

1. The Field of the Invention

The present invention relates to systems for electronically transferring funds. In particular, the present invention relates to electronic payment systems in which an account number is activated for a limited period of time or for a limited number of transactions, such that unauthorized persons are prevented from gaining access to the account.

2. The Prior State of the Art

During recent years, the use of cash in financial transactions has been increasingly replaced with various forms of electronic payment. For example, credit cards and debit cards are now commonly used by consumers to make purchases or to otherwise authorize the transfer of funds to merchants. Such electronic forms of payment have become widely used for many reasons, including convenience and the ability to maintain an electronic record of transactions.

In order to enable electronic payment, a bank or another financial institution typically establishes an account for a consumer and issues a card that enables a consumer to conveniently authorize funds to be drawn from the account. The account is generally associated with a multi-digit account number that uniquely identifies the account. Often, the account number is printed on the face of the card issued to the consumer and may also be encoded in a magnetic strip on the card. In order to execute a transaction using the account, the consumer can present the card to a merchant, who makes a copy of the account number written or encoded on the card. The merchant ordinarily verifies that the cardholder is authorized to make a purchase using the card by requiring the card holder's signature or receiving a personal identification number (PIN). The signature can be recognized as belonging to the cardholder by comparing the signature against an authorized signature written on the card. The PIN is a multi-digit number that is not encoded or written on the card but is instead memorized by the cardholder.

Signatures and PINs represent a first line of defense to prevent the unauthorized use of credit and debit cards by persons other than the rightful account holder. The cardholder's signature can be seen as evidence of the identity of the person using the card. Likewise, since the PIN is supposedly known only by the cardholder, its use by a person using the card generally verifies that the person is an authorized cardholder. In many situations, however, persons who fraudulently use credit or debit cards are able to circumvent these security measures. For instance, signatures can frequently be forged by unauthorized persons. Moreover, merchants sometimes do not carefully verify that the signature presented by a person using a card matches the authorized signature. There are also many commercial environments in which signatures cannot be obtained, such as automated teller machines, telephone commerce, self-serve gasoline pumps, and Internet and other on-line transactions. In these situations, merchants might require the user of the card to present a PIN. However, if an unauthorized person obtains the PIN in addition to the card number, there may be no way to detect fraudulent use until after the fact.

The difficulty of preventing the unauthorized use of credit or debit cards has made many consumers hesitant to use such forms of payment, particularly over the telephone and via the Internet or other communication networks. Many people have experienced the inconvenience of unauthorized use of their credit or debit cards. Financial institutions have also spent much time and effort in developing new systems of preventing unauthorized use of credit or debit cards.

It has been widely observed that consumers are hesitant to transmit their account numbers over open networks such as the Internet and the telephone systems. Many people fear that their account numbers will be intercepted, while others are reluctant to divulge their account numbers and PINs to persons who are essentially strangers. Encryption technology has been used to reduce the likelihood that credit and debit card numbers can be intercepted from the Internet during transmission. However, many experts in Internet security recognize that encryption technology can be seen as a moving target, in that security techniques that would recently have been foolproof are now subject to being breached.

In view of the foregoing, what is needed is a system for executing electronic transactions that introduce a level of security that has not been possible by the mere use of signatures, PINs, and encryption technology. It would be an advancement in the art to provide an electronic transaction system that will permit consumers to authorize the use of credit and debit accounts over the telephone or the Internet without the fear of the unauthorized use of their account numbers. It would be a further advancement in the art if such systems could be practiced in the basic architecture of conventional communications networks with little additional cost to consumers, merchants, or financial institutions.

SUMMARY AND OBJECTS OF THE INVENTION

The present invention relates to electronic transaction systems in which an account number is activated for a limited period of time or for a limited number of transactions. According to the invention, a financial institution establishes an account for an account holder. The account issuer creates two account numbers to be associated with the account. First, a conventional credit or debit card number is associated with the account. Second, a limited-use account number is associated with the account and is activated only upon an explicit request by the account holder.

The regular account number is activated indefinitely and can be used by the account holder to initiate transactions in a conventional manner. In situations where the account holder wants to employ heightened security measures, the account holder contacts the account issuer and requests that the limited-use number be temporarily activated. The limited-use account number remains activated until limited conditions are satisfied. For example, the limited conditions may specify that the limited-use number is to be deactivated when a certain number of transactions have been executed or when a certain period of time has expired.

Once the limited-use account number has been activated, the account holder can initiate transactions in a conventional manner. If for example, a limited-use account number is activated for a certain period of time, the account issuer deactivates the account number upon the expiration of the certain period of time. In the meantime, the account holder can use limited-use account number to initiate any desired number of transactions. Ifs the limited-use number is instead activated for a certain number of transactions, the account issuer uses the limited-use account number until the specified number of transactions have been executed. In either case, once the limited-use account number is deactivated, it cannot be used to authorize transactions until it is again activated.

The limited conditions under which the limited-use account number is activated gives account holders the assurance that their account will not be misused by an unauthorized person. In a specific example, an account holder can request that the limited-use account number be activated for a single transaction. The account holder can then transmit the limited-use account number over the Internet or over the telephone to execute a single transaction. After the transaction is completed, any person that may have obtained the account number will be prevented from gaining access to the account.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to electronic transaction systems in which an account number is activated for a limited period of time or for a limited number of transactions. According to the invention, a financial institution, or account issuer, establishes an account for an account holder. The financial institution issues a limited-use account number that is associated with the account and activated only upon an explicit request by the account holder.

In order to use the limited-use account number, the account holder transmits a request to the account issuer for activation of the limited-use number. Upon activation thereof, the account holder may execute one or more transactions. The limited-use number is deactivated when a specified number of transactions are executed or when a specified period of time has expired. The deactivation of the limited-use account number permits the account holder to divulge the account number with a significantly reduced apprehension that an unauthorized person will be able to gain unlimited access to funds in the account.

The present invention extends to computer-readable media having computer-executable instructions or data structures stored thereon. Examples of computer-readable media include RAM, ROM, EEPROM, CD-ROM or other optical disk storage, magnetic disk storage or other magnetic storage devices, or any other medium capable of storing instructions or data structures and capable of being accessed by a general purpose or special purpose computer. Computer-readable media also encompasses combinations of the foregoing structures. Computer-executable instructions comprise, for example, instructions and data that cause a general purpose computer, special purpose computer, or special purpose processing device to execute a certain function or group of functions. The computer-executable instructions and associated data structures represent an example of program code means for executing the steps of the invention disclosed herein.

The invention further extends to computer systems for executing transactions using the limited-use account numbers disclosed herein. Those skilled in the art will understand that the invention may be practiced in computing environments with many types of computer system configurations, including personal computers, multi-processor systems, network PCs, minicomputers, mainframe computers, and the like.

Figure 1:
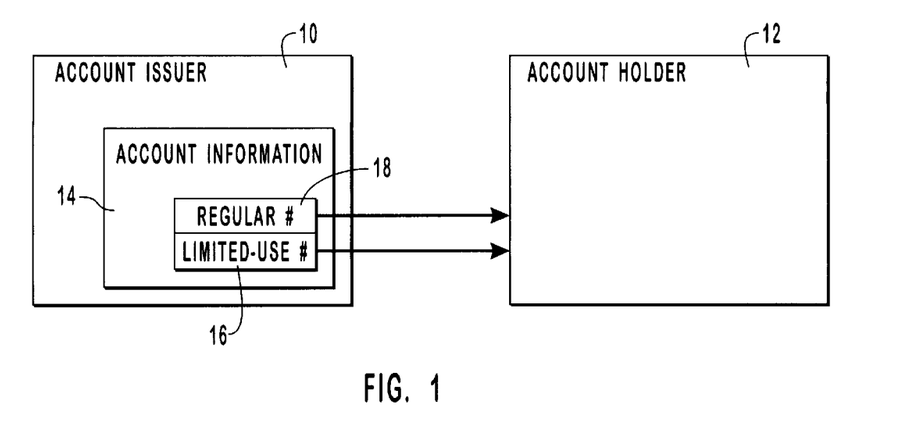
FIG. 1 is a schematic diagram illustrating an account issuer that issues a regular account number and a limited-use account number to an account holder.

FIG. 1 illustrates one example of the establishment of an account that is associated with a limited-use account number of the invention. Account issuer 10 establishes an account for account holder 12 by compiling account information 14. Account information 14 may be stored on a computer-readable medium associated with a computer system of the account issuer 10. The account represented by account information 14 may be a line of credit established for account holder 12, a deposit account such as a checking, savings, money market, or other investment account. Indeed, the account represented by account information 14 may be any account from which funds may be drawn on behalf of account holder 12.

In one embodiment of the invention, a limited-use account number 16 is created and associated with the account. As used herein, the term "account number" extends to a number or other identifying information that can be used to identify a particular account such that a transaction can be executed on the account. Limited-use account number 16 remains inactive until account holder 12 requests activation thereof.

In one embodiment of the invention, a regular account number 18 is also created and associated with the account. Regular account number 18 is to be activated and made available to account holder 12 to execute transactions for an indefinite or relatively long period of time. For example, regular account number 18 may be set to expire several months or years after issuance thereof, similar to the manner in which conventional credit and debits cards are made to expire after several months or years. While regular account number 18 provides a degree of flexibility and convenience to account holder 12 to execute transactions at will, as will be further described herein, the invention may be practiced by issuing only limited-use account number 16.

In one implementation of the invention, account issuer 10 issues a card, which may be similar to a conventional credit or debit card, to account holder 12. The card can have regular account number 18 encoded thereon. "Encoding" a number on the card, as used herein, includes writing, forming, printing, encoding in a computer-readable medium, or otherwise physically representing the number on the card. Limited-use account number 16 can be communicated to account holder 12 by letter or by another means in order to avoid printing the limited-use account number 16 on the card. Alternatively, limited-use account number 16 can be printed on a separate card from the card that includes the regular account number 18. According to yet another alternative, limited-use account number 16 and a regular account number 18 can be printed on a single card. However, as will be discussed in greater detail below, the latter alternative may be less desirable in many circumstances because it is often be preferable not to disclose both account numbers to a single merchant.

Figure 2:
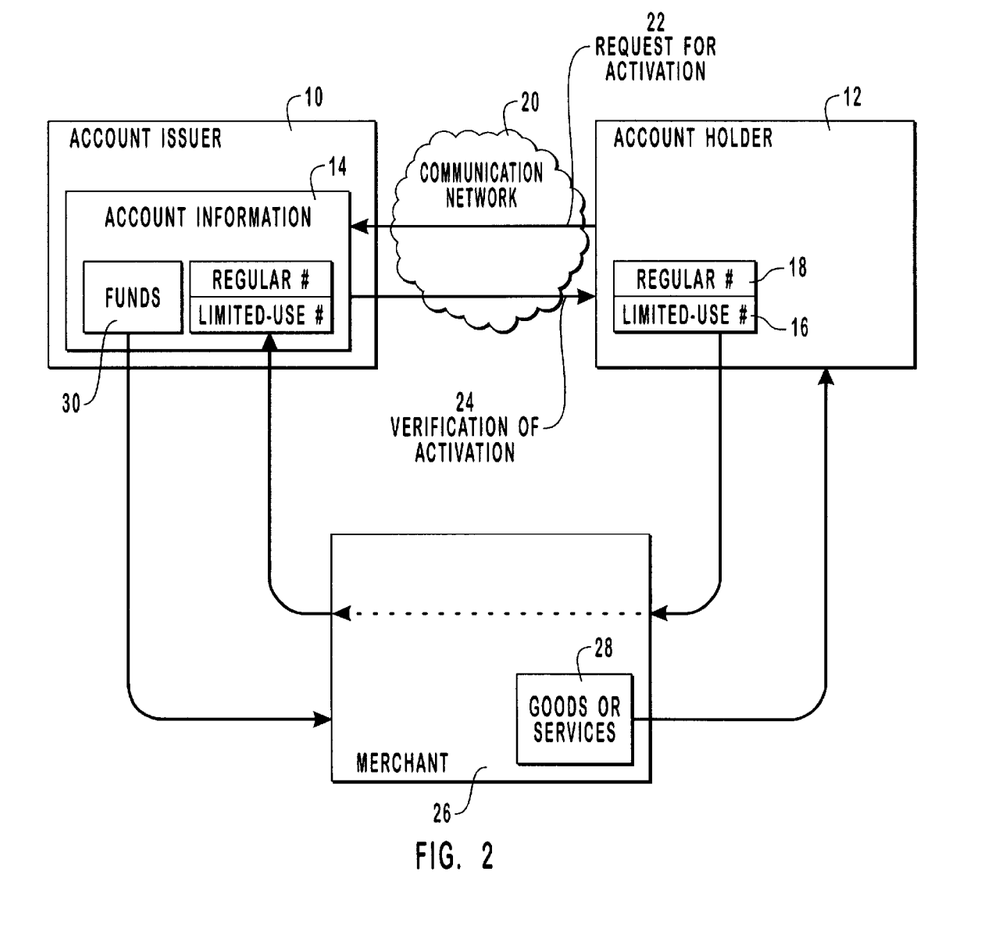
FIG. 2 is a schematic diagram depicting a transaction authorized using the limited-use account number.

FIG. 2 illustrates a typical transaction executed using the limited-use account number of the invention. To initiate a transaction, account holder 12 establishes communication with account issuer 10 by means of a communication network 20, which may be a conventional telephone system, the Internet, or the like. For instance, if the transaction is to be executed with a merchant over the telephone, the account holder may likewise establish communication with the account issuer 10 using a telephone. If account holder 12 is preparing to execute a transaction over the Internet, it may be convenient for account holder 12 to establish communication with account issuer 10 via the Internet. Of course, the identity of communication network 20 is not critical to the invention. Indeed, account holder 12 can optionally communicate with account issuer 10 face-to-face in a branch office of the account issuer 10.

Once communication has been established between account holder 12 and account issuer 10, the account holder makes a request 22 for activation of limited-use account number 16. In one embodiment, request 22 includes a private identifier in addition to limited-use account number 16 to verify the identity of the person making the request. For example, the private identifier can include a PIN, the account holder's birthday, or virtually any other piece of information that tends to verify that the account holder 12 is the person who has made request 22.

Request 22 can optionally specify the limited conditions under which the limited-use account number 16 is to be activated. For example, account holder 12 can be permitted to select the period of time or the number of transactions for which limited-use account number 16 is to be activated. Alternatively, the limited conditions under which limited-use account number 16 is to be activated can be standard so as not to require any selection by account holder 12. Upon activation of limited-use account number 16, account issuer 10 transmits a verification 24 that the account number has been activated. Alternatively, the invention can be practiced without the verification, in which case the account holder 12 would simply proceed under the assumption that limited-use account number 16 has been activated.

With limited-use account number 16 having been activated, account holder 12 communicates with merchant 26 to authorize the transaction. Account holder 12 can divulge limited-use account number 16 to merchant 26 in a conventional manner. For example, if the transaction is to be performed on a credit account, account holder 12 transmits limited-use account number 16 to merchant 26 as if it were a typical credit card number. In the example of FIG. 2, account holder 12 authorizes the transaction in return for goods or services 28 provided by merchant 26.

In order to receive payment based on limited-use account number 16, merchant 26 transmits a limited-use account number to account issuer 10 or to a third party according to any desired technique including those that are well-known in the art. In response to the communication of the limited-use account number 16, account issuer 10 initiates the transfer of funds 30 in the authorized amount to compensate merchant 26. Depending on the nature of the account, funds 30 can be drawn from a positive balance maintained in a deposit account, from a credit account to increase the amount owed on credit by the account holder, or according to any other financial arrangement.

Assuming that limited-use account number 16 has been activated for only a single transaction, the limited-use account number is deactivated after the account number has been communicated from the merchant 26 to account issuer 10. Thus, any subsequent attempt to use limited-use account number 16 to draw funds from the account will be unsuccessful until such time that account holder 12 again requests activation of the limited-use account number. If limited-use account number 16 has been activated for multiple transactions, it remains activated until account issuer 10 has executed the specified number of transactions. Likewise, account issuer 10 deactivates limited-use account number 16 after a specified period of time has elapsed where activation is requested for a limited period of time.

It is noted that the period of time for activation of limited-use account number 16 can be of any desired duration. In practice, the period of time will typically have a duration of minutes, hours, or days. Alternatively, the period of time can be on the order of weeks or longer, although a shorter duration is typically preferred. The factors involved in setting the period of time of activation of the limited-use account number can include making the period long enough to permit the account holder to execute the transaction without being unduly rushed, while making the period short enough to thwart the unauthorized use by others. In contrast, as discussed above, the regular account number can be activated indefinitely of for a relatively longer period of time (i.e., months or years) so as to permit the account holder to execute an essentially unlimited number of transactions at his or her convenience.

Figure 3:
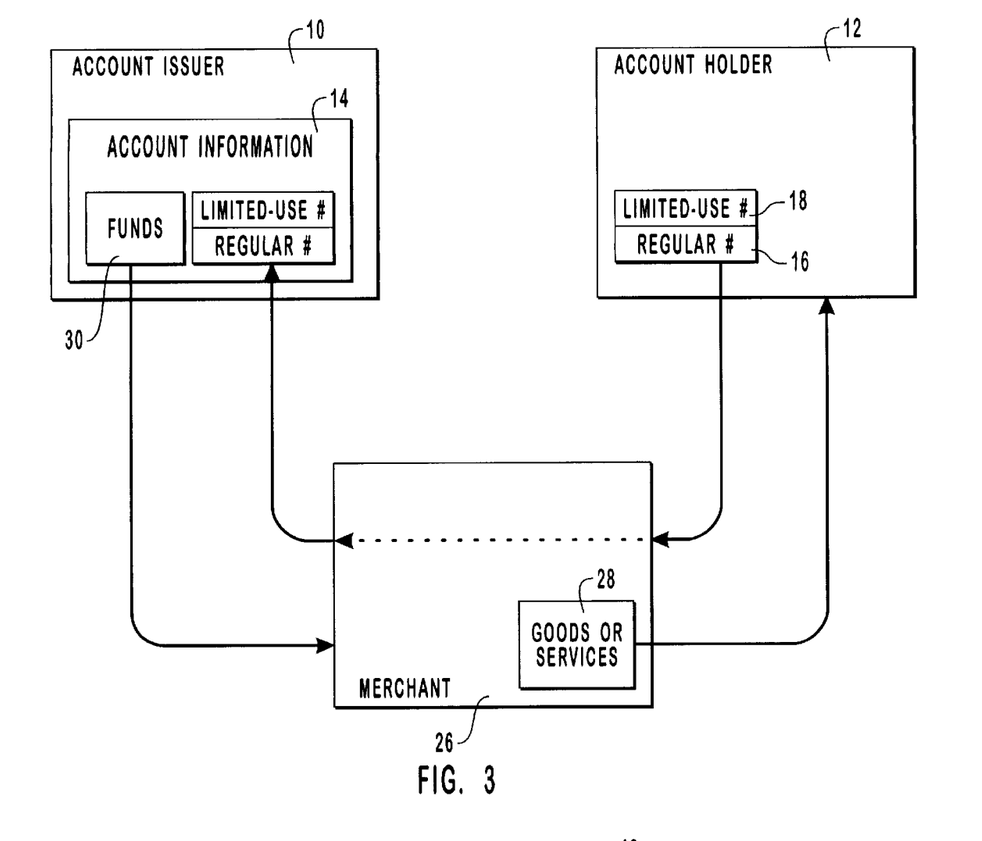
FIG. 3 is a schematic diagram illustrating a transaction authorized using the regular account number.

FIG. 3 illustrates the parties depicted in FIG. 2 engaging in a transaction using regular account number 18. As noted above, regular account number 18 can be activated for an indefinite period of time or number of transactions. If the account associated with account holder 12 is a credit account, the account holder can use regular account number 18 in the same manner as a conventional credit card number. The creation of regular account number 18 in addition to limited-use account number 16 provides account holder 12 the convenience of repeatedly accessing the account without having to establish communication with account issuer or to request activation of the account number. As shown in FIG. 3, account holder 12 divulges regular account number 18 to merchant 26, who then transmits the regular account number to account issuer 10. In response, account issuer 10 authorizes the transfer of funds 20 to merchant 26.

In view of the transactions depicted in FIGS. 2 and 3, it can be understood that account holders may find it desirable to use limited-use account number 16 in situations where the security of the transactions could otherwise be in doubt. For example, account holders 12 can advantageously use limited-use account number 16 over open networks such as the Internet or the public telephone system. Even if an unauthorized person were to intercept the limited-use account number 18, it is unlikely that this account number could be used in an unauthorized way, since the number remains in a deactivated state until account holder 12 specifically requests activation thereof. It can also be seen that in many situations, it may be undesirable to divulge both account numbers 16 and 18 to a merchant at the same time. If an account holder 12 were to divulge regular account number 18 when using limited-use account number 16, an unauthorized person may be able to obtain the regular account number and circumvent the security features associated with the invention. For this reason, limited-use account number 16 and regular account number 18 are not written on a single card in a preferred embodiment of the invention.

Figure 4:
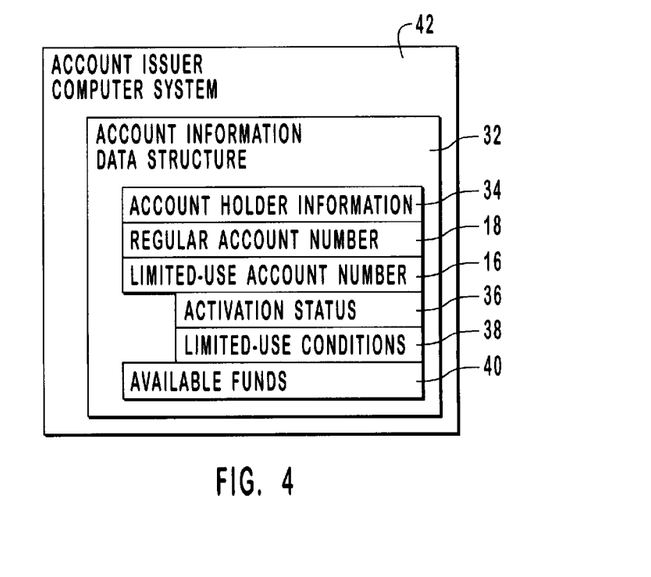
FIG. 4 illustrates a data structure that resides in a computer-readable medium and represents the account information for executing transactions according to the invention.

FIG. 4 illustrates an example of a data structure established in a computer system of an account issuer for tracking the status and activity of an account according to the invention. Account information data structure 32 includes data fields representing account holder information 34, such as the name, billing information, and identifying information associated with the account holder. Data structure 32 also includes regular account number 18, limited-use account number 16, the activation status 36 of the limited-use account number, and the limited-use conditions 38 for which limited-use account number can be activated. Activation status 36 includes, for example, a computer-readable code that indicates whether limited-use account number 16 is currently activated. Data structure 32 can also include a data field representing available funds 40 that can be transferred from the account.

Data structure 32 can reside at a computer-readable medium associated with computer system 42. Alternatively, the various data fields of data structure 32 may be located at different computer-readable mediums associated with computer system 42. Upon learning of the disclosure made herein, those skilled in the art will understand how to implement data structure 32 for storing and maintaining the information associated with the accounts of the inventions.

Figure 5:
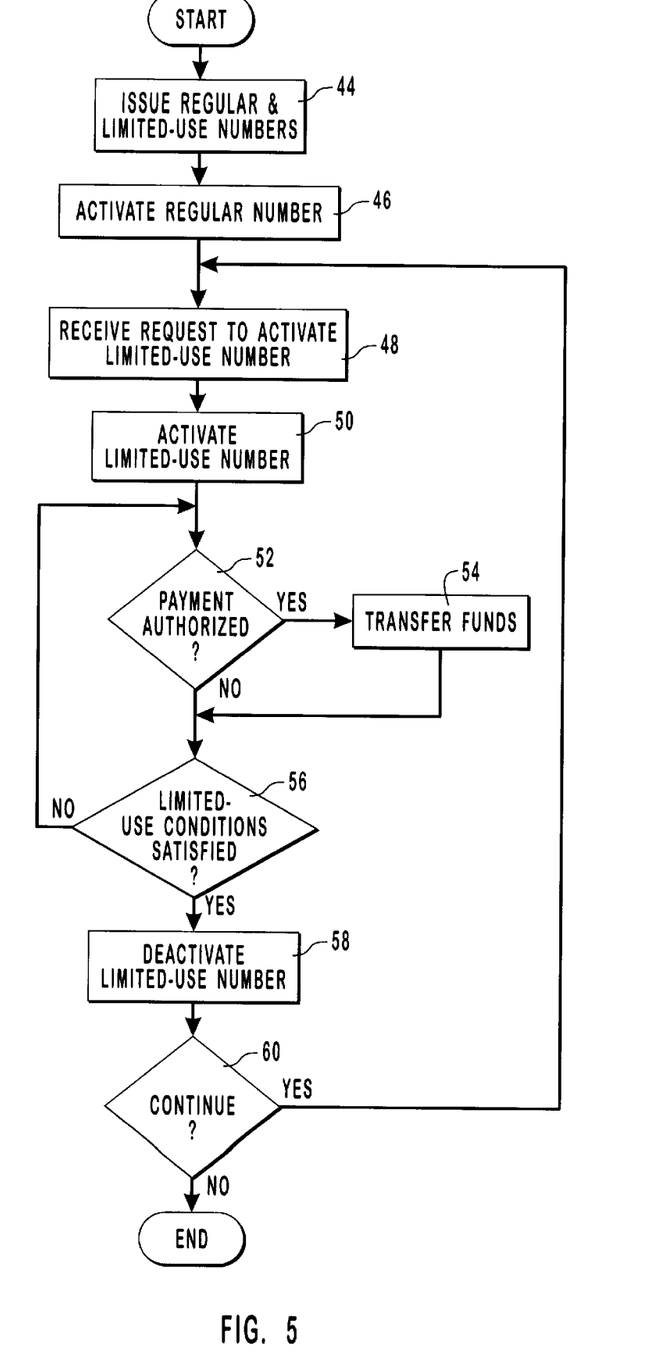
FIG. 5 is a flow chart depicting a method according to the invention for using the limited-use account number to execute financial transactions.

FIG. 5 is a flow chart illustrating an embodiment of the methods of the invention for executing transactions using the limited-use account number. In step 44, the account issuer issues the regular and limited-use numbers as discussed herein in reference to FIG. 1. In step 46, the regular account number is activated. This may be accomplished when the account is established for the account holder or when the account holder verifies that the regular account number has been successfully mailed or otherwise transmitted.

At a time selected by the account holder, the account issuer receives a request from the account holder to activate the limited-use account number as shown in step 48. In response to the request, the account issuer activates the limited-use account number in step 50. According to decision block 52, if the account holder subsequently authorizes funds to be transferred from the account as shown in FIG. 2, the method advances to step 54, in which funds are transferred from the account to the merchant.

The method then proceeds to decision block 56 in which it is determined whether the limited-use conditions have been satisfied. For example, the account issuer can determine whether a specified period of time has expired since the limited-use account number was activated or whether a specified number of transactions have been executed. If the limited-use conditions are not yet satisfied, the method returns to step 52 to permit one or more transactions to be authorized. If the limited-use conditions have been satisfied, the method advances to step 58, in which the limited-use account number is deactivated. As illustrated by decision block 60, the method can repeatedly activate the limited-use account number as instructed by the account holder, execute transactions with the limited-use number, and deactivate the limited-use number.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states letters patent is:

1. In a computer system maintained by an account issuer, a method for executing a financial transaction using an account that has at least two account numbers, one of which being a limited-use account number, comprising the steps of:

issuing a first account number associated with an account established by the account issuer, the first account number being activated such that an account holder associated with the account is capable of repeatedly authorizing funds to be transferred from the account using the first account number;

issuing a second account number associated with the account; such that the first account number and the second account number are both associated with the same account as opposed to being associated with two different accounts, the first account number and the second account number being associated with the same account to the extent that funds authorized for transfer using the first account number and funds authorized for transfer using the second account number are drawn from the same account rather than being drawn from two accounts, the second account number remaining inactive until the account holder requests activation thereof;

activating the second account number in response to a request for activation made by the account holder;

transferring funds from the account in response to the account holder making an authorization using the second account number; and deactivating the second account number upon satisfaction of a limited-use condition, such that the deactivated second account number cannot be used to transfer funds until another request for activation is made by the account holder.

2. A method as defined in claim 1, further comprising the step of transferring funds from the account in response to the account holder making another authorization, wherein the other authorization is made using the first account number, the first account remaining activated after the funds have been transferred.

3. A method as defined in claim 1, wherein
the limited-use condition comprises the elapsing of a predetermined period of time that begins when the step of activating the second account number is conducted.

4. A method as defined in claim 1, wherein
the limited-use condition comprises the completion of a predetermined number of transactions associated with the second account number.

5. A method as defined in claim 1, further comprising the step of establishing the account, wherein the account represents a line of credit provided for the account holder.

6. A method as defined in claim 1, further comprising the step of establishing the account, wherein the account is a deposit account to which the account holder deposits funds.

7. In a computer system, a method for executing a financial transaction such that a second account number associated with an account is activated only under limited conditions and used to authorize transfer of funds from the account only when the limited conditions are satisfied, comprising the steps of:

storing, in a computer-readable medium associated with the computer system:

a data structure by which an account is associated with an account holder;

a first account number associated with the account, the first account number being activated such that the account holder is capable of repeatedly authorizing funds to be transferred from the account using the first account number; and a second account number associated with the account, such that the first account number and the second account number are both associated with the same account as opposed to being associated with two different accounts, the first account number and the second account number being associated with the same account to the extent that funds authorized for transfer using the first account number and funds authorized for transfer using the second account number are drawn from the same account rather than being drawn from two accounts, the second account number remaining inactive until the account holder requests activation thereof;

adjusting the data structure in response to a request by the account holder for activation of the second account number, such that the data structure indicates that the second account number has been activated;

initiating a transfer of funds from the account in response to the account holder making an authorization using the second account number; and adjusting the data structure after initiating the transfer of funds, such that the data structure indicates that the second account number is deactivated, and such that the deactivated second account number cannot be used to transfer funds until another request for activation is made by the account holder.

8. A method as defined in claim 7, further comprising the step of initiating another transfer of funds from the account in response to the account holder making an authorization using the first account number.

9. A method as defined in claim 7, further comprising, after the steps of adjusting the data structure after initiating the transfer of funds, the steps of:

readjusting the data structure in response to another request by the account holder for activation of the second account number, such that the data structure again indicates that the second account number has been activated;

initiating another transfer of funds from the account in response to the account holder making another authorization using the second account number; and readjusting the data structure after initiating the other transfer of finds, such that the data structure again indicates that the second account number is deactivated, and such that the deactivated second account number cannot be used to transfer funds until yet another request for activation is made by the account holder.

10. A method as defined in claim 7, further comprising the steps of:

receiving a request to initiate another transfer of funds from the account using the second account number while the second account number is not activated; and declining to initiate the other transfer of funds.

11. In a computer system maintained by an account issuer, a method for executing a financial transaction such that a second account number associated with an account is activated only under limited conditions and used to authorize transfer of funds from the account until the limited conditions are satisfied, comprising the steps of:

issuing a first account number associated with an account established by the financial institution, the first account number being activated such that an account holder associated with the account is capable of repeatedly authorizing funds to be transferred from the account using the first account number;

issuing a second account number associated with the account, such that the first account number and the second account number are both associated with the same account as opposed to being associated with two different accounts, the first account number and the second account number being associated with the same account to the extent that funds authorized for transfer using the first account number and funds authorized for transfer using the second account number are drawn from the same account rather than being drawn from two accounts, the second account number remaining inactive until the account holder requests activation thereof;

transferring funds from the account in response to the account holder making an authorization using the first account number;

activating the second account number in response to a request for activation made by the account holder, wherein the second account number is to remain activated according to limited conditions;

transferring funds from the account in response to the account holder making another authorization, wherein the other authorization is made using the second account number; and deactivating the second account number when the limited conditions have been satisfied, such that the deactivated second account number cannot be used to transfer funds until another request for activation is made by the account holder.

12. A method as defined in claim 11, wherein the limited conditions specify that the step of deactivating the second account number is to be conducted upon expiration of a specified period of time that begins when the step of activating the second account number is conducted.

13. A method as defined in claim 11, wherein the limited conditions specify that the step of deactivating the second account number is to be conducted when the step of transferring funds from the account has been conducted a specified number of times.

14. A method for authorizing funds to be transferred from an account by an account holder such that a second account number associated with an account is activated only under limited conditions and used to authorize transfer of funds from the account until the limited conditions are satisfied, comprising the steps of:

receiving, by the account holder, a first account number from an account issuer, the first account number being associated with an account established by the account issuer, the first account number being activated such that the account holder is capable of repeatedly authorizing funds to be transferred from the account using the first account number, receiving, by the account holder, a second account number associated with the account, such that the first account number and the second account number are both associated with the same account as opposed to being associated with two different accounts, the first account number and the second account number being associated with the same account to the extent that funds authorized for transfer using the first account number and funds authorized for transfer using the second account number are drawn from the same account rather than being drawn from two accounts, the second number remaining inactive until the account holder requests activation thereof;

requesting, by the account holder, activation of the second account number, such that second account number becomes activated until limited conditions are satisfied; and authorizing, by the account holder, funds to be transferred from the account using the second account number, wherein, after the funds are transferred, the second account number becomes deactivated such that the deactivated second account number cannot be used to transfer funds until another request for activation is made by the account holder.

15. A method as defined in claim 14, further comprising the step of authorizing, by the account holder, funds to be transferred from the account using the first account number, after which the first account number remains activated.

16. A method as defined in claim 14, wherein the step of authorizing funds to be transferred comprises the step of transmitting a message to the account issuer.

17. A method as defined in claim 16, wherein the message is transmitted to the account issuer by the Internet.

18. A method as defined in claim 16, wherein the message is transmitted to the account issuer by telephone.

19. A method as defined in claim 14, wherein:
the limited conditions comprise the elapsing of a predetermined period of time that begins when the second account number becomes activated; and
the second account number becomes deactivated upon the elapsing of the predetermined period of time.

20. A method as defined in claim 19, wherein the step of requesting activation of the second account number comprises the step of selecting, by the account holder, a duration of the predetermined period of time.

21. A method as defined in claim 14, wherein:
the limited conditions comprise the completion of a predetermined number of transactions associated with the second account number; and
the second account number becomes deactivated upon the completion of the predetermined number of transactions.

22. A method as defined in claim 21, wherein the step of requesting activation of the second account number comprises the step of selecting, by the account holder, a number that is designated as the predetermined number of transactions.

23. A method as defined in claim 14, wherein the step of receiving the first account number comprises the step of obtaining a card having encoded thereon the first account number, the second account number not being encoded on the card.

24. A computer program product for implementing a method of maintaining an account for an account holder, the account having at least two account numbers, one of which being a limited-use account number, wherein the method is capable of being implemented using a computer system of an account issuer, the computer program product comprising:

a computer-readable medium carrying computer-executable instructions for implementing the method, wherein the computer-executable instructions comprise:

program code means for issuing a first account number associated with an account established by the account issuer, the first account number being activated such that an account holder associated with the account is capable of repeatedly authorizing funds to be transferred from the account using the first account number;

program code means for issuing a second account number associated with the account, such that the first account number and the second account number are both associated with the same account as opposed to being associated with two different accounts, the first account number and the second account number being associated with the same account to the extent that funds authorized for transfer using the first account number and funds authorized for transfer using the second account number are drawn from the same account rather than being drawn from two accounts, the second account number remaining inactive until the account holder requests activation thereof;

program code means for activating the second account number in response to a request for activation made by the account bolder;

program code means for transferring funds from the account in response to the account bolder making an authorization using the second account number; and program code means for deactivating the second account number upon satisfaction of a limited-use condition, such that the deactivated second account number cannot be used to transfer funds until another request for activation is made by the account holder.

25. A computer program product as defined in claim 24, wherein the computer-executable instructions further comprise program code means for transferring funds from the account in response to the account holder making an authorization using the first account number, wherein the first account number remains activated after the funds are transferred.

26. A computer program product as defined in claim 24, wherein the computer-executable instructions further comprise program code means for receiving the request for activation via the Internet.

27. A computer program product as defined in claim 24, wherein:
the limited conditions comprise a specified number of transactions; and
the computer-executable instructions further comprise program code means for detecting the execution of the specified number of transactions using the second account number, wherein the second account number is to be deactivated after the execution of the specified number of transactions.

28. A computer program product as defined in claim 24, wherein:
the limited conditions comprise the elapsing of a predetermined period of time after activation of the second account number; and
the computer-executable instructions further comprise program code means for detecting the elapsing of the predetermined period of time after activation of the second account number, wherein the second account number is to be deactivated after the elapsing of the specified period of time.

29. A computer program product as defined in claim 24, wherein the program code means for activating the second account number comprises program code means for determining whether the request for activation includes a private identifier associated with the account holder.

30. A method for executing a financial transaction using an account that has at least two account numbers, wherein one of the at least two account numbers is a limited-use account number, comprising the steps of:

issuing a first account number associated with an account established by the account issuer, the first account number being activated such that an account holder associated with the account is capable of repeatedly authorizing funds to be transferred from the account using the first account number;

activating a second account number associated with the account, the first account number and the second account number both being associated with the same account as opposed to being associated with two different accounts, the first account number and the second account number being associated with the same account to the extent that funds authorized for transfer using the first account number and funds authorized for transfer using the second account number are drawn from the same account rather than being drawn from two accounts;

transferring funds from the account in response to the account holder authorizing the funds to be transferred from the account using the second account number; and deactivating the second account number upon satisfaction of a limited-use condition, such that the deactivated second account number can no longer be used to transfer funds from the account.

31. A method as defined in claim 30, wherein the limited-use condition comprises the elapsing of a predetermined period of time.

32. A method as defined in claim 31, wherein the predetermined period of time is measured from the activation of the second account number.

33. A method as defined in claim 31, wherein the predetermined period of time is specified by the account holder.

34. A method as defined in claim 31, wherein the predetermined period of time is specified by the account issuer.

* * * * *